U.S. Patent No.: US 10,844,193 B2
Date of Patent: *Nov. 24, 2020

(12) United States Patent
Bastioli et al.

(54) POLYMER COMPOSITIONS CONTAINING ALIPHATIC ESTERS AS PLASTICISERS

(71) Applicant: Novamont S.p.A., Novara (IT)

(72) Inventors: Catia Bastioli, Novara (IT); Luigi Capuzzi, Novara (IT); Francesca Digioia, Barengo (IT); Nicola Marini, Varallo Pombia (IT)

(73) Assignee: NOVAMONT S.P.A., Novara (IT)

( * ) Notice: Subject to any disclaimer, the term of this patent is extended or adjusted under 35 U.S.C. 154(b) by 256 days.

This patent is subject to a terminal disclaimer.

(21) Appl. No.: 15/111,053

(22) PCT Filed: Jan. 9, 2015

(86) PCT No.: PCT/EP2015/050336
§ 371 (c)(1),
(2) Date: Jul. 12, 2016

(87) PCT Pub. No.: WO2015/104375
PCT Pub. Date: Jul. 16, 2015

(65) Prior Publication Data
US 2016/0347931 A1  Dec. 1, 2016

(30) Foreign Application Priority Data
Jan. 13, 2014 (IT) .............................. MI2014A0030

(51) Int. Cl.
| | |
|---|---|
| *C08K 5/11* | (2006.01) |
| *C08G 63/16* | (2006.01) |
| *C08K 5/00* | (2006.01) |
| *C08K 5/10* | (2006.01) |
| *C08L 67/04* | (2006.01) |
| *C08J 3/18* | (2006.01) |

(52) U.S. Cl.
CPC ................ *C08K 5/11* (2013.01); *C08G 63/16* (2013.01); *C08J 3/18* (2013.01); *C08K 5/0016* (2013.01); *C08K 5/10* (2013.01); *C08L 67/04* (2013.01); *C08J 2327/06* (2013.01)

(58) Field of Classification Search
CPC ....................................................... C08K 5/11
USPC ......................................................... 524/311
See application file for complete search history.

(56) References Cited

U.S. PATENT DOCUMENTS

| | | | | |
|---|---|---|---|---|
| 7,361,704 | B2 * | 4/2008 | Mitsudera ................ | C08K 5/10 524/296 |
| 2004/0001941 | A1 * | 1/2004 | Kusek .................... | B29C 70/521 428/292.1 |
| 2007/0006961 | A1 * | 1/2007 | Kusek ................. | B29C 53/8066 156/169 |
| 2008/0161508 | A1 * | 7/2008 | Matsumoto ................ | C08J 5/18 525/450 |
| 2009/0232753 | A1 * | 9/2009 | Healy .................... | A61K 8/042 424/59 |
| 2010/0093574 | A1 * | 4/2010 | Nagakari ............. | C10M 141/06 508/304 |
| 2014/0357769 | A1 * | 12/2014 | Zheng ..................... | C08L 69/00 524/116 |
| 2014/0364551 | A1 * | 12/2014 | Hohner ................... | C08L 23/28 524/318 |

FOREIGN PATENT DOCUMENTS

| | | | |
|---|---|---|---|
| EP | 1468982 A1 | 10/2004 | |
| WO | WO-92/06147 A1 | 4/1992 | |
| WO | WO 2012085012 A2 * | 3/2012 | ............. C08G 63/06 |

OTHER PUBLICATIONS

Nagendramma et al., "Study of synthesized ecofriendly and biodegradable esters: first resistance and lubricating properties", Lubrication Science, vol. 22, Dec. 31, 2010, pp. 103-110.

* cited by examiner

Primary Examiner — Jane L Stanley
(74) Attorney, Agent, or Firm — Polsinelli PC

(57) ABSTRACT

Disclosed is the use of a composition of aliphatic esters having the following general formula: $R_1$—O—C(O)—$R_4$—C(O)—[—O—$R_2$—O—C(O)—$R_5$—C(O)—]$_m$—O—$R_3$, in which: $R_1$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids; $R_2$ comprises —$CH_2$—$C(CH_3)_2$—$CH_2$— and $C_2$-$C_8$ alkylene groups, and comprises at least 50% in moles of the said —$CH_2$—$C(CH_3)_2$—$CH_2$— groups; $R_3$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids; $R_4$ and $R_5$ comprise one or more $C_2$-$C_{22}$ alkylenes and comprise at least 50% in moles of $C_7$ alkylenes; and m lies between 1 and 20, as plasticizers for polymer compositions, for example, vinyl polymers of the polyvinyl chloride (PVC) type, thermoplastic elastomers, and hydroxy acid polyesters, for example polyesters of lactic acid.

20 Claims, No Drawings

POLYMER COMPOSITIONS CONTAINING ALIPHATIC ESTERS AS PLASTICISERS

CROSS REFERENCE TO RELATED APPLICATIONS

This application is a National Phase filing under 35 U.S.C. § 371 of PCT/EP2015/050336 filed on Jan. 9, 2015; and this application claims priority to Application No. MI2014A000030 filed in Italy on Jan. 13, 2014 under 35 U.S.C. § 119. The entire contents of each application are hereby incorporated by reference.

This invention relates to a family of aliphatic esters which are particularly suitable for use as plasticizers and thermoplastic polymer compositions comprising them. In particular this invention relates to the use of a family of aliphatic esters having the following general formula:

$$R_1-O-C(O)-R_4-C(O)-[-O-R_2-O-C(O)-R_5-C(O)-]_m-O-R_3$$

in which:
- $R_1$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids;
- $R_2$ comprises $-CH_2-C(CH_3)_2-CH_2-$ groups and $C_2$-$C_8$ alkylenes, and comprises at least 50% by moles of said $-CH_2-C(CH_3)_2-CH_2-$ groups;
- $R_3$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids;
- $R_4$ and $R_5$ comprise one or more $C_2$-$C_{22}$ alkylenes, preferably $C_2$-$C_{11}$, more preferably $C_4$-$C_9$, and comprise at least 50% by moles of $C_7$ alkylenes;
- m is a number between 1-20, preferably 2-10, more preferably 3-7;

as plasticizers in thermoplastic polymer compositions.

These aliphatic esters are particularly suitable for use as plasticizers for various types of thermoplastic polymers, such as for example vinyl polymers of the polyvinyl chloride (PVC) type, thermoplastic elastomers, for example nitrile rubbers and SBR rubbers, and hydroxy acid polyesters, for example lactic acid-based polyesters (among others PLA).

As is known, plasticizers are very important additives in the plastics materials sectors which, particularly by reducing the glass transition temperature of the polymers, improve many of their properties, above all their workability, flexibility, resilience and elasticity. In addition to this, depending upon the chemical structure of the plasticiser and the nature of the polymer with which it is mixed, they can also help to improve their insulating properties and adhesiveness.

A typical category of plasticizers for plastics materials are phthalic esters, typically known as "phthalates". However their use has for a long time been the subject of many controversies associated with the potential effects which such compounds might have on human health. The chemical industry has therefore been engaged in searching for alternative plasticizers to the phthalates for some time.

In order to be effectively used, a plasticiser must show some properties such as for example complete miscibility with the polymers with which it is being mixed, so it can be stably and uniformly incorporated in them and will not tend to migrate towards the surface of the plastics material (so-called "exudation") over time. They must also generally have low volatility, possibly be odorless and colourless, resistant to the action of solvents, heat and light, and must be chemically stable, for example to hydrolysis by environmental moisture or oxygen. Given the multiple properties on which they act, and in the light of the many characteristics which it is desirable that they should have, the identification and development of new plasticizers has therefore been the ongoing object of intense research in the plastics materials industry.

One object of this invention is therefore to develop a family of aliphatic esters capable of being used as plasticizers for a wide spectrum of polymers and capable of demonstrating performance in use which, if not equivalent, is even better than that of the plasticizers currently commercially available, for example the phthalates.

In particular, this invention concerns the use of aliphatic esters having the following formula:

$$R_1-O-C(O)-R_4-C(O)-[-O-R_2-O-C(O)-R_5-C(O)-]_m-O-R_3$$

in which:
- $R_1$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids;
- $R_2$ comprises $-CH_2-C(CH_3)_2-CH_2-$ groups and $C_2$-$C_8$ alkylenes, and comprises at least 50% by moles of said $-CH_2-C(CH_3)_2-CH_2-$ groups;
- $R_3$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids;
- $R_4$ and $R_5$ comprise one or more $C_2$-$C_{22}$ alkylenes, preferably $C_2$-$C_{11}$, more preferably $C_4$-$C_9$, and comprise at least 50% by moles of $C_7$ alkylenes;
- m is a number between 1-20, preferably 2-10, more preferably 3-7, as plasticizers in thermoplastic polymer compositions.

This invention also relates to the use of mixtures comprising two or more of these esters.

When mixed, either individually or as mixtures, with thermoplastic polymers such as vinyl polymers of the PVC type or thermoplastic elastomers, for example nitrile rubbers and SBR rubbers, these esters are capable of for example ensuring mechanical properties which are wholly equivalent to those of other known commercially available plasticizers, such as diisononyl phthalate.

The present invention therefore refers also to thermoplastic polymer compositions comprising at least one thermoplastic polymer preferably selected from chlorinated vinyl polymers, for example PVC, thermoplastic elastomers, for example nitrile rubbers and SBR rubbers, and hydroxy acid polyesters, such as for example polylactic acid (PLA), and at least one plasticizer comprising one or more aliphatic esters having general formula:

$$R_1-O-C(O)-R_4-C(O)-[-O-R_2-O-C(O)-R_5-C(O)-]_m-O-R_3$$

in which:
- $R_1$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids;
- $R_2$ comprises $-CH_2-C(CH_3)_2-CH_2-$ groups and $C_2$-$C_8$ alkylenes, and comprises at least 50% by moles of said $-CH_2-C(CH_3)_2-CH_2-$ groups;
- $R_3$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids;

$R_4$ and $R_5$ comprise one or more $C_2$-$C_{22}$ alkylenes, preferably $C_2$-$C_{11}$, more preferably $C_4$-$C_9$, and comprise at least 50% by moles of $C_7$ alkylenes;

m is a number between 1-20, preferably 2-10, more preferably 3-7.

In the aliphatic esters according to this invention $R_1$ and $R_3$ are selected independently of each other from one or more of the following groups: H, linear and branched saturated and unsaturated alkyl residues of the $C_1$-$C_{24}$ type, or polyol residues esterified with $C_1$-$C_{24}$ monocarboxylic acids. In a preferred embodiment, $R_1$ is different from $R_3$ if $R_1$ is H.

With reference to $R_1$ and $R_3$, examples of linear and branched saturated and unsaturated alkyl residues of the $C_1$-$C_{24}$ type are methyl, ethyl, propyl, butyl, pentyl, nonyl, allyl, isopropyl, isobutyl, isopentyl, methylbutyl, methylpentyl and methylethyl residues.

As regards the polyol residues which are reacted with $C_1$-$C_{24}$ monocarboxylic acids, these derive from polyols comprising one or more hydroxyl groups such as for example 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, neopentylglycol, 2-methyl-1,3-propandiol, dianhydrosorbitol, dianhydromannitol, dianhydroiditol, cyclohexandiol, cyclohexanmethandiol, pentaerythritol, glycerol, polyglycerol, trimethylolpropane and their mixtures.

The said polyols are bound to the structure of the aliphatic esters according to this invention through one of their hydroxyl groups.

As far as the remaining hydroxyl groups of the polyols are concerned, these are partly or fully esterified with one or more $C_1$-$C_{24}$ monocarboxylic acids. These $C_1$-$C_{24}$ monocarboxylic acids may be of the linear or branched saturated or unsaturated type and may advantageously have one or more hydroxyl or carbonyl groups in the chain.

Typical examples of $C_1$-$C_{24}$ monocarboxylic acids of this type are pelargonic acid, stearic acid, palmitic acid, 9-ketostearic acid, 10-ketostearic acid, 9-hydroxystearic acid and 10-hydroxystearic acid.

In a preferred embodiment, at least one of $R_1$ and/or $R_3$ comprise, preferably in amount of $\geq 10\%$ by moles, more preferably $\geq 20\%$, even more preferably $\geq 25\%$ by moles, with respect to the total amount of $R_1$ and/or $R_3$, polyol residues esterified with at least one $C_1$-$C_{24}$ monocarboxylic acids selected from the group consisting of stearic acid, palmitic acid, 9-ketostearic acid, 10-ketostearic acid and mixtures thereof.

In a particularly preferred embodiment, at least one of $R_1$ and/or $R_3$ comprise, preferably in amount of $\geq 5\%$ by moles, more preferably $\geq 9\%$ by moles, with respect to the total amount of $R_1$ and/or $R_3$, polyol residues esterified with at least one $C_1$-$C_{24}$ monocarboxylic acids selected from the group consisting of 9-ketostearic acid, 10-ketostearic acid and mixtures thereof.

It has been discovered that the aliphatic esters according to the present invention comprising this kind of $R_1$ and/or $R_3$ groups, show, and maintain over time, reduced values of Storage Modulus (G') when subjected to torsional deformations. Reduced values of Storage Modulus (G') indicate an improved shear stress resistance of the polymer compositions containing them. Polymer compositions with improved shear stress resistance are particularly suitable for manufacturing products subjected to twisting, bending or folding movements, such as for examples electric cables and wires.

The composition and structure of the aliphatic esters according to the present invention may be determined according to any method known to the skilled person, for example by means of HPLC-MS.

With reference to $R_2$, this comprises —$CH_2$—$C(CH_3)_2$—$CH_2$— and $C_2$-$C_8$ alkylene groups, preferably $C_2$-$C_4$, and comprises at least 50% in moles, preferably at least 75%, of the said —$CH_2$—$C(CH_3)_2$—$CH_2$— groups. In a preferred embodiment $R_2$ is the —$CH_2$—$C(CH_3)_2$—$CH_2$— group.

As far as $R_4$ and $R_5$ are concerned, these are the same or different and comprise independently of each other one or more $C_2$-$C_{22}$ alkylenes, preferably $C_2$-$C_{11}$, more preferably $C_4$-$C_9$, and comprise at least 50% by moles, preferably at least 60%, and more preferably at least 65%, of $C_7$ alkylenes. In a particularly preferred embodiment $R_4$ and $R_5$ are both $C_7$ alkylenes.

In the esters according to this invention the —C(O)—$R_4$—C(O)— and —C(O)—$R_5$—C(O)— groups advantageously derive from linear $C_4$-$C_{24}$ aliphatic dicarboxylic acids, preferably $C_4$-$C_{13}$, more preferably $C_4$-$C_{11}$ and their $C_1$-$C_{24}$ alkyl esters, preferably $C_1$-$C_4$. Examples of the said dicarboxylic acids or their esters are: succinic acid, dimethyl succinate, dibutyl succinate, glutaric acid, dimethyl glutarate, dibutyl glutarate, adipic acid, dimethyl adipate, dibutyl adipate, pimelic acid, suberic acid, dimethyl suberate, dibutyl suberate, azelaic acid, dimethyl azelate, dibutyl azelate, sebacic acid, dimethyl sebacate, dibutyl sebacate, undecandioic acid, dodecandioic acid, brassylic acid, dimethyl brassylate, dibutyl brassylate.

In one embodiment of this invention the aliphatic esters derive from mixtures comprising at least 50% in moles, preferably more than 60% in moles and more preferably more than 65% in moles, of azelaic acid and its $C_1$-$C_{24}$ esters.

The aliphatic esters according to this invention may be prepared according to any of the methods known to those skilled in the art, for example by means of esterification or transesterification reactions. In particular the aliphatic esters according to this invention can be prepared by transesterifying mixtures containing alkyl esters of linear aliphatic dicarboxylic acids with polyols, for example neopentylglycol. Those skilled in the art will be in a position to select suitable conditions for preparation in order to obtain the aliphatic esters with the desired m values, for example working with stoichiometric quantities or with a lesser or greater excess of polyols in comparison with the moles of linear aliphatic dicarboxylic acids. The said esterification and transesterification reactions are performed under suitable temperature and pressure conditions, advantageously in the presence of suitable catalysts.

Depending upon the —C(O)—$R_4$—C(O)— and —C(O)—$R_5$—C(O)— groups in the aliphatic esters, those skilled in the art will be in a position to modify the composition of the linear aliphatic dicarboxylic acids and their mixtures which have to be esterified or transesterified. The said mixtures may be prepared in any way known to those skilled in the art, for example by mixing all their components together or preparing preliminary mixtures which will be subsequently mixed. It is also possible that mixtures of dicarboxylic acids which are already commercially available or available as by-products may be used as a basis, appropriately modifying their composition subsequently according to requirements.

In a preferred embodiment, the mixtures of linear aliphatic dicarboxylic acids are for example obtained as intermediate products or by-products from processes for the oxidation of vegetable oils such as those for example described in patent applications WO 2008/138892, WO 2011/080296 or as an evaporate in the process of preparing the complex oligomer structures described in patent applications WO 2012/085012 and PCT/EP2013/062588. The linear aliphatic dicarboxylic acid mixtures obtained from the oxidation of sunflower oil and milk thistle oil and in general from vegetable oils having a high oleic acid content, are of particular interest and make it possible for example to obtain mixtures having a high content of azelaic acid.

In addition to helping make use of renewable resources and preserving resources of fossil origin, use of acid mixtures deriving from the processes described above has the further advantage that it makes use of products and process fractions which would otherwise be regarded as by-products and which, in order to be marketed or in any event utilised individually, would require complex purification processes.

The aliphatic esters according to this invention are particularly suitable for use individually or as mixtures as plasticizers for a wide spectrum of thermoplastic polymers. Thus this invention also relates to thermoplastic polymer compositions comprising at least one plasticizer comprising one or more of the aliphatic esters described above.

In one embodiment this invention relates to thermoplastic polymer compositions comprising from 10 to 80% by weight of a plasticizer comprising one or more aliphatic esters described above.

As far as the said thermoplastic polymer compositions are concerned, these may include one or more thermoplastic polymers selected from chlorinated vinyl polymers, for example PVC, thermoplastic elastomers, for example nitrile rubbers and SBR rubbers, and hydroxy acid polyesters, such as for example polylactic acid (PLA).

Of the chlorinated vinyl polymers, these are here to be understood to include, in addition to polyvinyl chloride: polyvinylidene chloride, polyethylene chloride, poly (vinyl chloride-vinyl acetate), poly (vinyl chloride-ethylene), poly (vinyl chloride-propylene), poly (vinyl chloride-styrene), poly (vinyl chloride-isobutylene) as well as copolymers in which the polyvinyl chloride represents more than 50% by moles. The said copolymers may be random, block or alternating copolymers. Preferably the polymer compositions comprising one or more of the said chlorinated vinyl polymers comprise 10 to 80% by weight of the aliphatic esters according to this invention.

With regard to the thermoplastic elastomers, these comprise both natural rubbers (NR) and synthetic rubbers. Examples of synthetic rubbers are rubbers having a diene base such as vinylarene-diene conjugate copolymers (e.g. SBR, styrene/butadiene rubber), diene polymers (e.g. polybutadiene, isoprene), ethylene-propylene copolymers, in particular ethylene/propylene/diene terpolymers (EPDM, ethylene/propylene/diene monomer) and thermoplastic elastomers such as styrene-butadiene-styrene (SBS) block copolymers, nitrile rubbers, acrylonitrile-butadiene copolymers (NBR) and styrene-isoprene-styrene (SIS) copolymers.

In a preferred embodiment of the invention the elastomers are selected from nitrile rubbers or random conjugate vinylarene-diene copolymers.

Preferably, the polymer compositions comprising one or more of the said thermoplastic elastomers comprise 5 to 70% by weight of the plasticizer comprising the aliphatic esters according to this invention.

Examples of hydroxy acid polyesters are: poly L-lactic acid, poly D-lactic acid and stereo complex poly D-L lactic acid, poly-ε-caprolactone, polyhydroxybutyrate, polyhydroxybutyrate-valerate, polyhydroxybutyrate propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly 3-hydroxybutyrate-4-hydroxybutyrate. Preferably, the said polyesters are those of lactic acid, here also indicated by PLA: poly L-lactic acid, poly D-lactic acid and stereo complex poly D-L-lactic acid and copolymers comprising more than 50% in moles of the said lactic acid polyesters. Preferably the polymer compositions comprising one or more of the said lactic acid polyesters comprise from 10 to 80% by weight of the plasticizer comprising the aliphatic esters according to this invention.

The polymer compositions according to this invention, in addition to the aliphatic esters described in this invention, may also comprise other additives such as other plasticizers, fillers, biofillers, pigments, nucleating agents, extender oils, separating agents, crosslinking agents, compatibilising agents, dyes and thermal stabilisers.

Thanks to the plasticising properties of the aliphatic esters according to this invention the polymer compositions comprising it may be effectively used to produce manufactured articles such as lifesaving surgical drapes, electrical cables, wires, films, synthetic fabrics for clothing and shoes, and components for the motor industry.

In addition to the purposes described above the aliphatic esters according to this invention may also find application as modifying agents for polyesters and polyamides, and as impregnating components for wood and bases for thermo-hardening and thermoplastic polyurethanes.

The aliphatic esters according to this invention may be added to the polyesters and polyamides at any stage during their processing, and depending upon the conditions of addition may act as reactive and non-reactive modifying agents. When the aliphatic esters according to this invention are used as reactive modifying agents, effective quantities of compounds likely to encourage such reactions, such as for example transesterification catalysts, crosslinking agents, chain extenders and peroxides, may advantageously be added.

As far as polyesters are concerned, these in general here include biodegradable and non-biodegradable polyesters of the diacid-diol type. The biodegradable polyesters may be either aliphatic or aliphatic-aromatic.

Biodegradable aliphatic polyesters from diacid-diols may comprise aliphatic diacids and aliphatic diols while the biodegradable aliphatic-aromatic polyesters have an aromatic part mainly comprising aromatic acids with multiple functional groups of both synthetic origin and renewable origin, the aliphatic part comprising aliphatic diacids and aliphatic diols.

The biodegradable aliphatic aromatic polyesters from diacids-diols are preferably characterised by an aromatic acids content of between 30 and 90% by moles, preferably between 45 and 70% by moles with respect to the acid component.

Preferably the aromatic acids having multiple functional groups of synthetic origin are dicarboxylic aromatic compounds of the phthalic acid type and their esters, preferably terephthalic acid. The aromatic acids having multiple functional groups of renewable origin are preferably selected from the group comprising 2,5-furandicarboxylic acid and its esters.

Particularly preferred are biodegradable aliphatic-aromatic polyesters from diacids-diols in which the aromatic diacid component comprises mixtures of aromatic acids having multiple functional groups of synthetic and renewable origin.

The aliphatic diacids of biodegradable aliphatic polyesters and aliphatic-aromatic polyesters are aliphatic dicarboxylic acids such as oxalic acid, malonic acid, succinic acid, glutaric acid, 2-methylglutaric acid, adipic acid, pimelic acid, suberic acid, azelaic acid, sebacic acid, undecanoic acid, dodecanoic acid and brassylic acid, their esters and their mixtures. Of these, those preferred are adipic acid and dicarboxylic acids from renewable sources, among these the dicarboxylic acids from renewable sources such as succinic acid, sebacic acid, azelaic acid, undecandioic acid, dodecandioic acid and brassylic acid and their mixtures being particularly preferred.

Examples of aliphatic diols in the biodegradable polyesters from diacids-diols are: 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, neopentylglycol, 2-methyl-1,3-propandiol, dianhydrosorbitol, dianhydromannitol, dianhydroiditol, cyclohexandiol, cyclohexanmethandiol and their mixtures. Of these 1,4-butandiol, 1,3-propandiol and 1,2-ethandiol and their mixtures are particularly preferred.

Preferably the composition of the aliphatic esters according to this invention with the biodegradable polyesters from diacid-diols described above are characterised by a content of the plasticizer comprising said aliphatic esters which varies within the range from 0.2 to 20% by weight with respect to the total weight of the said compositions, preferably between 0.5 and 10%.

Among the non-biodegradable polyesters, those preferred are: PET, PBT, PTT and polyalkylene furandicarboxylates. Of the latter, those particularly preferred are polyethylene furandicarboxylate, polypropylene furandicarboxylate, polybutylene furandicarboxylate and their mixtures.

Preferably the aliphatic ester compositions according to this invention with the non-biodegradable polyesters are characterised by a content of the plasticizer comprising said aliphatic esters which varies within the range from 0.2 to 20% by weight with respect to the total weight of the said compositions.

Examples of polyamides are: polyamide 6 and 6,6, polyamide 9 and 9,9, polyamide 10 and 10,10, polyamide 11 and 11,11, polyamide 12 and 12,12 and their combinations of the 6/9, 6/10, 6/11 and 6/12 type. Preferably the compositions of the aliphatic esters according to this invention with the polyamides are characterised by a content of the plasticizer comprising said aliphatic esters which varies within the range from 0.2 to 20% by weight with respect to the total weight of the said compositions.

The invention will now be illustrated by a number of examples which are intended to be merely illustrative and not limiting upon it.

EXAMPLES

Example 1

Preparation of Aliphatic Esters According to the Invention

A mixture comprising butyl esters and a smaller quantity of linear aliphatic dicarboxylic and monocarboxylic acids obtained by evaporation during the synthesis of the complex oligomer structures described in Example 1 of WO 2012/085012 was used to prepare the aliphatic esters. 100 grams of this mixture having the following composition:

|  | % in moles |
| --- | --- |
| monobutyl azelate | 3.1 |
| dibutyl suberate | 2 |
| dibutyl azelate | 82.6 |
| butyl palmitate | 4.1 |
| dibutyl undecandioate | 1 |
| butyl stearate | 3.1 |
| butyl ketostearate (1:1 mixture of butyl 10-ketostearate and butyl 9-ketostearate) | 4.1 | were placed together with 19 g of neopentylglycol in a flask heated by an electrical jacket and fitted with a thermometer, a magnetic stirrer, a reflux distillation column and glass rings and a system for regulating reflux into the flask, a condenser and a flask for collection of the condensate. The system was heated with stirring at 100° C., and once complete dissolution of the neopentylglycol had been achieved, 0.0223 g of Tyzor TE® were added. The system was then gradually heated to 250° C., distilling from the reaction medium via butanol and water. After the temperature of 250° C. had been reached, gradual vacuum was applied until 20 mbar was reached. On completion of the reaction a condensate comprising butanol and water was recovered from the condenser.

The aliphatic esters obtained took the form of a clear yellow liquid and were analysed by HPLC-MS. For the analysis 2 mg of the mixture of esters were dissolved in 10 ml of acetonitrile and analysed under the following conditions:

Column: Kinetex 2.6 μm C8 100 Å 100×2.1 mm

Eluents:
(A)=50 mM $CH_3COONH_4$ with HCOOH pH=4;
(B)=$CH_3CN$;

Elution programme

| Time (minutes) | A (% vol) | B (% vol) |
| --- | --- | --- |
| 0 | 40 | 60 |
| 30 | 5 | 95 |
| 50 | 5 | 95 |
| 55 | 40 | 60 |

Flow (ml/min): 0.5

Injector volume (μl): 10

Column T (° C.): 40

Mass spectrometer conditions: ESI ionising source (positive ionisation), Sheath gas flow rate (a.u.) 20, Aux gas flow rate (a.u.) 0, Source Voltage (Kv): 4.5, Capillary Temperature (° C.): 275, Capillary Voltage (V): 28, Tube Lens Voltage (V): 80, Scan: Full scan 150-2000 and 350-3500 Da HPLC-MS characterisation of the said esters revealed the presence of a mixture of compounds having the following structure:

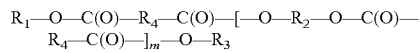

with $R_1$ and $R_3$=H, butyl, —$CH_2$—$C(CH_3)_2$—$CH_2$—O—C(O)—$(CH_2)_7$—C(O)—$(CH_2)_8$—$CH_3$, —$CH_2$—$C(CH_3)_2$—$CH_2$—O—C(O)—$(CH_2)_8$—C(O)—$(CH_2)_7$—$CH_3$, —$CH_2$—$C(CH_3)_2$—$CH_2$—O—C(O)—$(CH_2)_{14}$—$CH_3$, —$CH_2$—$C(CH_3)_2$—$CH_2$—O—C(O)—$(CH_2)_{16}$—$CH_3$; $R_4$ and $R_5$=$C_6$ and $C_7$ and $C_9$ alkylenes, m being between 1 and 10 (mean value=3).

Examples of these esters are:

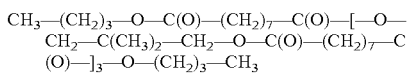

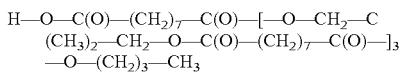

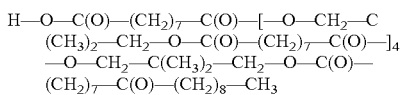

Examples 2-4

Three mixtures of butyl esters having the following compositions:

|  | Example | | |
|---|---|---|---|
|  | 2 (% in moles) | 3 (% in moles) | 4 (% in moles) |
| butyl pelargonate | 0.00 | 2.00 | 6.09 |
| monobuyl azelate | 13.29 | 9.37 | 9.62 |
| dibutyl suberate | 1.21 | 0.89 | 1.19 |
| dibutyl azelate | 64.05 | 45.37 | 41.48 |
| butyl palmitate | 8.16 | 14.61 | 14.88 |
| dibutyl undecandioate | 1.21 | 0.86 | 0.81 |
| butyl oleate | 0.91 | 1.50 | 1.48 |
| butyl stearate | 5.74 | 12.09 | 11.38 |
| butyl ketostearate (1:1 mixture of butyl 10-ketostearate and butyl 9-ketostearate) | 5.14 | 11.19 | 10.81 |
| butyl arachidate | 0.00 | 0.49 | 0.72 |
| butyl behenate | 0.30 | 1.63 | 1.56 | were used to prepare three aliphatic esters in the same preparation conditions of Example 1 using the following amounts of neopentylglycol

|  | Example 2 | Example 3 | Example 4 |
|---|---|---|---|
| Mixture of butyl ester (g) | 1000 | 1000 | 1000 |
| Neopentylglycol (g) | 242.2 | 253.3 | 182.8 |

HPLC-MS characterisation of the said esters revealed the presence of a mixture of compounds having the same general structure of the esters according to Example 1 with $R_1$ and $R_3$=H, butyl, $—CH_2—C(CH_3)_2—CH_2—O—C(O)—(CH_2)_7—C(O)—(CH_2)_8—CH_3$, $—CH_2—C(CH_3)_2—CH_2—O—C(O)—(CH_2)_8—C(O)—(CH_2)_7—CH_3$, $—CH_2—C(CH_3)_2—CH_2—O—C(O)—(CH_2)_{14}—CH_3$, $—CH_2—C(CH_3)_2—CH_2—O—C(O)—(CH_2)_{16}—CH_3$; $R_4$ and $R_5=C_6$ and $C_7$ and $C_9$ alkylenes, m being between 1 and 10 (mean value=3 for Examples 2 and 3, =2 for Example 4).

Table 1 herebelow reports the amount of $R_1$ and/or $R_3$ groups of the esters according to Examples 1-4 comprising polyols residues esterified with at least one acid selected from stearic acid, palmitic acid, 9-ketostearic acid, 10-ketostearic acid and mixtures thereof, as determined according to the HPLC-MS analysis as above described in the present application.

TABLE 1

|  | % in moles of $R_1$ and/or $R_3$ groups comprising polyols residues esterified with at least one acid selected from stearic acid, palmitic acid, 9-ketostearic acid, 10-ketostearic acid | % in moles of $R_1$ and/or $R_3$ groups comprising polyols residues esterified with at least one acid selected from 9-ketostearic acid, 10-ketostearic acid |
|---|---|---|
| Es. 1 | 25.61 | 9.32 |
| Es. 2 | 54.28 | 19.67 |
| Es. 3 | 87.58 | 41.24 |
| Es. 4 | 65.01 | 29.08 |

Examples 5 and 12

Use as Plasticizers for Polyvinyl Chloride

The plasticising properties of the aliphatic esters according to the invention were compared with those of a conventional plasticiser, diisononyl phthalate (DINP, marketed by Polynt under the brand name DIPLAST® NS) and ester of trimellitic acid with a blend of n-octanol and n-decanol (marketed by Polynt under the brand name DIPLAST® TM 8-10/ST). Identical polymer compositions based on a grade of commercially available polyvinyl chloride (NORVINYL 7102 PVC, marketed by Ineos) which differed only in the type of plasticiser used were prepared for the purpose. The compositions are shown in Table 2.

TABLE 2

Quantification by weight of the polymer compositions prepared according to Examples 5-12

| Material | Example 5 (parts by weight) | Example 6 comparison (parts by weight) | Example 7 (parts by weight) | Example 8 (parts by weight) | Example 9 (parts by weight) | Example 10 (parts by weight) | Example 11 comparison (parts by weight) | Example 12 comparison (parts by weight) |
|---|---|---|---|---|---|---|---|---|
| PVC [1] | 100 | 100 | 100 | 100 | 100 | 100 | 100 | 100 |
| Plasticiser [1] | 50 | — | 50 | — | — | — | — | — |
| Plasticiser [2] | — | — | — | 50 | — | — | — | — |
| Plasticiser [3] | — | — | — | — | 50 | — | — | — |
| Plasticiser [4] | — | — | — | — | — | 50 | — | — |
| Plasticiser [5] | — | 50 | — | — | — | — | 50 | — |
| Plasticiser [6] | — | — | — | — | — | — | — | 50 |
| Stabiliser [1] | 1 | 1 | — | — | — | — | — | — |

TABLE 2-continued

Quantification by weight of the polymer compositions prepared according to Examples 5-12

| Material | Example 5 (parts by weight) | Example 6 comparison (parts by weight) | Example 7 (parts by weight) | Example 8 (parts by weight) | Example 9 (parts by weight) | Example 10 (parts by weight) | Example 11 comparison (parts by weight) | Example 12 comparison (parts by weight) |
|---|---|---|---|---|---|---|---|---|
| Stabiliser [2] | 1 | 1 | — | — | — | — | — | — |
| Stabiliser [3] | — | — | 8 | 8 | 8 | 8 | 8 | 8 |

PVC [1] = PCV K70 (PVC NORVINYL 7102);
Plasticiser [1] = aliphatic ester prepared according to Example 1;
Plasticiser [2] = aliphatic ester prepared according to Example 2;
Plasticiser [3] = aliphatic ester prepared according to Example 3;
Plasticiser [4] = aliphatic ester prepared according to Example 4;
Plasticiser [5] - diisononyl phthalate (DINP);
Plasticiser [6] = ester of trimellitic acid with a blend of n-octanol and n-decanol (DIPLAST ® TM 8-10/ST);
Stabiliser [1] = calcium stearate;
Stabiliser [2] = zinc stearate;
Stabiliser [3] = Calcium/Zinc stabilizer (Bareopan MC 8890 KA/S).

The polymer compositions were prepared in a HAAKE RHEOMIX 600 mixer according to compound preparation procedure reported in standard ASTM D2538: the individual components were weighed, homogenised by manual mixing and subsequently loaded into the mixer chamber. The following conditions were used for processing:
Temperature=150° C. (Examples 5 and 6—comparison) and 170° C. (Examples 7, 8, 9, 10, 11—comparison, 12—comparison);
40 r.p.m.;
Mixing time: 7 minutes.

The processing of the polymer compositions mixtures was comparable.

Sheets of thickness 0.25 mm, 1.5 mm and 3.0 mm were compression moulded for each polymer compositions so prepared. During moulding the samples were moulded at 5000 psi and T=150° C. for 6 minutes (Example 5 and 6) and at 5000 psi and T=170° C. for 6 minutes (Example 7, 8, 9, 10, 11—comparison, 12—comparison). The compression moulded sheets were left to equilibrate for 24 hours at 23° C.±1° C. and 50%±5% RH.

The polymer compositions were then compression moulded 5000 psi and T=150° C. for 6 minutes (Example 5 and 6) and 5000 psi and T=170° C. for 6 minutes (Example 7, 8, 9, 10, 11—comparison, 12—comparison)) obtaining sheets of different thickness for each (0.25 mm, 1.5 mm and 3.0 mm). The compression moulded sheets were allowed to equilibrate for 24 hours at 23° C.±1° C. and 50%±5% RH and were characterised by analysing their tensile properties, their Shore A hardness and their resistance to extraction in different solvents as well as their properties as a function of temperature.

Determination of Tensile Properties

Tensile properties were determined in accordance with Standard ASTM D412, using a rate of extension v=500 mm/min. The test samples were obtained by punching out the sheets of thickness 1.5 mm. A cutting die according to standard ASTM D 412 was used to prepare the samples. The tensile strength ($\sigma_b$), the maximum load ($\sigma_{max}$), the elongation corresponding to the tensile strength ($\varepsilon_b$), the elongation corresponding to the maximum load ($\varepsilon@\sigma_{max}$) and the Elastic Modulus for an elongation of 100% ($E_{100\%}$), 200% ($E_{200\%}$) and 300% ($E_{300\%}$) were measured for each mixture. The same properties and the weight loss were determined also on the samples after ageing in a ventilated oven maintained at 140° C. for 7 days. Before testing, aged samples were allowed to equilibrate for 24 hours at 23° C.±1° C. and 50%±5% RH.

Determination of Shore A Hardness

Shore A hardness was determined according to standard ASTM D2240. The samples were obtained by obtaining 3.0 cm×3.0 cm samples from the compression moulded sheets of thickness 3.0 mm obtained by compression moulding. The samples so obtained were stacked to achieve a final thickness of at least 6.0 mm in accordance with the procedure specified in standard ASTM D2240. The Shore A hardness value has been recorded after 15 seconds from the beginning of the measure.

Resistance to Extraction in Different Solvents

The resistance of the plasticizers to extraction in different solvents was evaluated using the procedure described in standard ASTM D1239. The samples were obtained by cutting samples of dimensions 5.0 cm×5.0 cm from the compression moulded sheets of thickness 0.25 mm. The following solvents were used for the extraction tests:
Soapy water: distilled water containing 1.0% by weight of Marseille soap. The soap had been previously dehydrated by leaving it in a ventilated stove at 105° C. for 60 minutes. The extraction tests were performed at 40° C. over 24 hours.
Oil: sunflower oil having a high oleic acid content (Agripur AP 80). The extraction tests were performed at 40° C. over 24 hours.
n-octane: the extraction tests were performed at 23° C. over 24 hours.

On completion of the tests the samples were washed to remove any traces of possible solvents, dried with a sheet of paper and allowed to equilibrate at 20° C. for 24 hours.

DMTA Analysis

The DMTA analysis were performed using a rotational rheometer TA instruments Ares G2. The measurements were made by using the torsion geometry mode with a rectangular sample in a temperature window of from −80° C. to 50° C. with a temperature rate of 3° C./minute. For the analysis a frequency of oscillation 1 Hz and 0.1% of deformation was used. A second set of samples was aged in a ventilated oven maintained at 140° C. for 7 days and the DMTA properties were determined also on these samples. Before testing, aged samples were allowed to equilibrate for 24 hours at 23° C.±1° C. and 50%±5% RH.

As will be seen from the data shown in Table 3a, the tensile properties and Shore A hardness of the PVC mixtures plasticised with aliphatic esters according to the invention (Example 5, 7, 8, 9, 10) are similar to those of the comparison mixtures plasticised using DINP (Example 6 and 11—comparison) and using DIPLAST® TM 8-10/ST Example 12—comparison).

TABLE 3a

Tensile and Shore A hardness properties of the mixtures

|  | $\sigma_{MAX}$ (MPa) | ε at σMAX (%) | $\sigma_b$ (MPa) | $\varepsilon_b$ (%) | $E_{100\%}$ (MPa) | $E_{200\%}$ (MPa) | $E_{300\%}$ (%) | Shore A |
|---|---|---|---|---|---|---|---|---|
| Example 5 | 18.8 | 365.7 | 18.8 | 365.7 | 8.2 | 6.5 | 5.6 | 76 |
| Example 6 - comparison | 19.1 | 348.0 | 19.1 | 348.0 | 10.2 | 7.4 | 6.0 | 82 |
| Example 7 | 19.26 | 313.54 | 19.26 | 313.54 | 10.1 | 7.56 | 6.35 | 77 |
| Example 8 | 20.60 | 352.43 | 20.60 | 352.43 | 11.78 | 8.08 | 6.40 | 80 |
| Example 9 | 21.10 | 361.83 | 21.10 | 361.83 | 12.70 | 8.17 | 6.42 | 84 |
| Example 10 | 16.50 | 287.34 | 16.50 | 287.34 | 9.83 | 6.94 | 5.60 | 78 |
| Example 11 - comparison | 20.20 | 330.15 | 20.20 | 330.15 | 12.32 | 8.18 | 6.48 | 82 |
| Example 12 - comparison | 21.3 | 245.5 | 21.3 | 245.5 | 14.3 | 8.75 | 6.70 | 90 |

As can be seen from the data on Table 3b, the samples containing the esters according to the present invention retain relevant mechanical properties after ageing, similarly to DIPLAST® TM 8-10/ST. The polymer composition plasticized with DINP, instead, has shown a remarkable reduction of the mechanical properties.

TABLE 3b

Tensile properties of the mixtures after ageing in a ventilated oven at 140° C. for 7 days

|  | $\sigma_{MAX}$ (MPa) | $\varepsilon_{at\ \sigma MAX}$ (%) | $\sigma_b$ (MPa) | $\varepsilon_b$ (%) | $E_{100\%}$ (MPa) | $E_{200\%}$ (MPa) | $E_{300\%}$ (%) | Weight loss (%) |
|---|---|---|---|---|---|---|---|---|
| Example 7 | 21.45 | 287.83 | 21.45 | 287.83 | 17.58 | 10.03 | 7.20 | −8.55 |
| Example 8 | 21.05 | 334.55 | 21.05 | 334.55 | 15.93 | 9.35 | 6.85 | −4.92 |
| Example 9 | 21.48 | 354.93 | 21.48 | 354.93 | 15.15 | 9.15 | 6.73 | −4.22 |
| Example 10 | 20.80 | 186.27 | 20.80 | 186.27 | 19.47 | 10.10 | n.d.* | −11.04 |
| Example 11 - comparison | 63.40 | 1.80 | 63.40 | 1.80 | n.d.* | n.d.* | n.d.* | −23.37 |
| Example 12 - comparison | 19.15 | 316.43 | 19.15 | 316.43 | 14.08 | 8.53 | 6.28 | −0.99 |

*n.d. = not detectable

As for the tests of resistance to extraction of the plasticizers, Table 4 shows the % loss in weight of the test pieces subjected to the tests described above.

TABLE 4

Resistance to extraction in different solvents

|  | Soapy water | Oil | n-octane |
|---|---|---|---|
| Example 5 | −5.3 | −8.1 | −10.40 |
| Example 6 - comparison | −1.2 | −11.1 | −23.92 |
| Example 7 | −5.82 | −9.55 | −12.09 |
| Example 8 | −1.91 | −6.52 | −9.91 |
| Example 9 | −2.05 | −8.82 | −12.83 |
| Example 10 | −8.30 | −15.15 | ,18.99 |
| Example 11 - comparison | −1.06 | −13.28 | −22.08 |
| Example 12 - comparison | −0.5 | −12.9 | −24.5 |

Considering both the process of preparation and the mechanical properties and resistance to extraction by solvents properties of the mixtures obtained, the aliphatic esters according to the invention appear to be wholly equivalent to conventional plasticizers.

With regard to the DMTA analysis, the herebelow tables show the values of G' @ 25° C., G' @ −25° C., Onset G', Max G" and Max Tan (δ) for the polymer compositions of Examples 7-12 as such (Table 5a) and after 7 days of ageing in a ventilated oven maintained at 140° C. (Table 5b).

TABLE 5a

|  | Ex. 7 | Ex. 8 | Ex. 9 | Ex. 10 | Ex. 11 - comparison | Ex. 12 - comparison |
|---|---|---|---|---|---|---|
| G' @ 25° C. (MPa) | 11 | 25 | 38 | 23 | 27 | 72 |
| G' @ −25° C. (MPa) | 760 | 1300 | 950 | 710 | 812 | 650 |
| Max G" (° C.) | −27 | −18 | −19 | −31 | −29 | −33 |
| Max Tan (δ) (° C.) | 12 | 21 | 27 | 18 | 22 | 46 |

TABLE 5b

|  | Ex. 7 | Ex. 8 | Ex. 9 | Ex. 10 | Ex. 11 - comparison | Ex. 12 - comparison |
|---|---|---|---|---|---|---|
| G' @ 25° C. (MPa) | 83 | 68 | 69 | 173 | 1210 | 75 |
| G' @ −25° C. (MPa) | 1300 | 1600 | 1300 | 1400 | 1390 | 730 |
| Max G" (° C.) | 0 | −3 | −9 | −6 | ≈50 | −31 |
| Max Tan (δ) (° C.) | 34 | 31 | 33 | 45 | ≈50 | ≈50 |

Examples 13—Comparison, 14, 15 and 16—Comparison

| Material | Example 13 - comparison (parts by weight) | Example 14 (parts by weight) | Example 15 (parts by weight) | Example 16 - comparison (parts by weight) |
|---|---|---|---|---|
| PVC [1] | 100 | 100 | 100 | 100 |
| Plasticiser [6] | 50 | — | . | — |
| Plasticiser [2] | — | 50 | — | . |
| Plasticiser [3] | — | — | 50 | — |
| Plasticiser [5] | — | — | — | 50 |
| Filler [1] | 30 | 30 | 30 | 30 |
| Oil [1] | 5 | 5 | 5 | 5 |
| Stabilizer [3] | 8 | 8 | 8 | 8 |
| Stabilizer [4] | 1 | 1 | 1 | 1 |

PVC [1] = PCV K70 (PVC NORVINYL 7102);
Plasticiser [2] = aliphatic ester prepared according to Example 2;
Plasticiser [3] = aliphatic ester prepared according to Example 3;
Plasticiser [5] - diisononyl phthalate (DINP);
Plasticiser [6] = ester of trimellitic acid with a blend of n-octanol and n-decanol (DIPLAST ® TM 8-10/ST);
Filler [1] = CaCO$_3$;
Oil [1] = epoxidised soybean oil;
Stabiliser [3] = Calcium/Zinc stabilizer (Bareopan MC 8890 KA/S);
Stabiliser [4] = Octadecyl-3-(3,5-di-tert.butyl-4-hydroxyphenyl)-propionate (Irganox 1076, marketed by BASF).

The polymer compositions were prepared in a HAAKE RHEOMIX 600 mixer according to standard ASTM D2538: the individual components were weighed, homogenised by manual mixing and subsequently loaded into the mixer chamber. The following conditions were used for processing:

Temperature=and 170° C.;
40 r.p.m.;
Mixing time: 7 minutes.

The processing of the polymer compositions mixtures was comparable.

Sheets of thickness 1.5 mm were compression moulded for each polymer compositions so prepared. During moulding the samples were moulded at 5000 psi and T=170° C. for 6 minutes. The compression moulded sheets were left to equilibrate for 24 hours at 23° C.±1° C. and 50%±5% RH.

The polymer compositions were then compression moulded (T=170° C. for 6 minutes) obtaining sheets of 1.5 mm thickness for each polymer compositions prepared. The compression moulded sheets were allowed to equilibrate for 24 hours at 23° C. and 55% RH and were characterised by analysing their tensile properties according to the method above disclosed (Tables 6a and 6b).

TABLE 6a

Tensile properties of the polymer compositions as such

|  | $\sigma_{MAX}$ (MPa) | ε at σMAX (%) | $\sigma_b$ (MPa) | $\varepsilon_b$ (%) |
|---|---|---|---|---|
| Example 13 - comparison | 15.95 | 269.70 | 15.95 | 269.70 |

TABLE 6a-continued

Tensile properties of the polymer compositions as such

|  | $\sigma_{MAX}$ (MPa) | ε at σMAX (%) | $\sigma_b$ (MPa) | $\varepsilon_b$ (%) |
|---|---|---|---|---|
| Example 14 | 15.83 | 309.42 | 15.83 | 309.42 |
| Example 15 | 15.14 | 260.01 | 15.14 | 260.01 |
| Example 16 - comparison | 17.08 | 326.58 | 17.08 | 326.58 |

TABLE 6b

Tensile properties of the polymer compositions after 7 days of ageing in a ventilated oven maintained at 140° C.

|  | $\sigma_{MAX}$ (MPa) | ε at σMAX (%) | $\sigma_b$ (MPa) | $\varepsilon_b$ (%) | Weight loss (%) |
|---|---|---|---|---|---|
| Example 13 - comparison | 14.84 | 257.40 | 14.84 | 257.40 | −0.32 |
| Example 14 | 15.66 | 250.97 | 15.66 | 250.97 | −3.52 |
| Example 15 | 15.57 | 248.06 | 15.57 | 248.06 | −2.65 |
| Example 16 - comparison | 38.00 | 2.20 | 38.00 | 2.20 | −22.28 |

The invention claimed is:

1. A polymer composition comprising at least one thermoplastic polymer, and at least one plasticizer comprising a composition of one or more aliphatic esters having general formula:

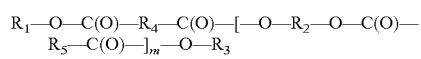

in which:
R$_1$ is selected from one or more of the groups consisting of H, linear and branched saturated and unsaturated alkyl residues of the C$_1$-C$_{24}$ type, and polyol residues esterified with C$_1$-C$_{24}$ monocarboxylic acids;
R$_2$ comprises —CH$_2$—C(CH$_3$)$_2$—CH$_2$— and C$_2$-C$_{24}$ alkylene groups, and comprises at least 50% by moles of the said —CH$_2$—C(CH$_3$)$_2$—CH$_2$— groups;
R$_3$ is selected from one or more of the groups consisting of H, linear and branched saturated and unsaturated alkyl residues of the C$_1$-C$_{24}$ type, and polyol residues esterified with C$_1$-C$_{24}$ monocarboxylic acids;
R$_4$ and R$_5$ comprise one or more C$_2$-C$_{22}$ alkylenes and comprise at least 50% by moles of C$_7$ alkylenes;
m lies between 1 and 20;
wherein R$_1$ is different from R$_3$ if R$_1$ is H;
and wherein at least one of the R$_1$ and/or R$_3$ is present in an amount of ≥10% by moles, with respect to the total amount of R$_1$ and/or R$_3$, of polyol residues esterified with at least one C$_1$-C$_{24}$ monocarboxylic acid selected from the group of stearic acid, palmitic acid, 9-ketostearic acid, 10-ketostearic acid and mixtures thereof.

2. The polymer composition according to claim 1, in which $R_1$ is H and $R_3$ is different from $R_1$.

3. The polymer composition according to claim 2, in which $R_4$ and $R_5$ are $C_7$ alkylenes.

4. The polymer composition according to claim 2, comprising from 10 to 80% by weight of the said aliphatic esters.

5. The polymer composition according to claim 2, in which said one or more thermoplastic polymers are selected from chlorinated vinyl polymers, thermoplastic elastomers and hydroxy acid polyesters.

6. The polymer composition according to claim 2, in which $R_2$ is the —$CH_2$—$C(CH_3)_2$—$CH_2$—group.

7. The polymer composition according to claim 6, in which $R_4$ and $R_5$ are $C_7$ alkylenes.

8. The polymer composition according to claim 7, comprising from 10 to 80% by weight of the said aliphatic esters.

9. The polymer composition according to claim 6, comprising from 10 to 80% by weight of the said aliphatic esters.

10. The polymer composition according to claim 1, in which $R_2$ is the —$CH_2$—$C(CH_3)_2$—$CH_2$—group.

11. The polymer composition according to claim 10, in which $R_4$ and $R_5$ are $C_7$ alkylenes.

12. The polymer composition according to claim 10, comprising from 10 to 80% by weight of the said aliphatic esters.

13. The polymer composition according to claim 10, in which said one or more thermoplastic polymers are selected from chlorinated vinyl polymers, thermoplastic elastomers and hydroxy acid polyesters.

14. The polymer composition according to claim 1, in which $R_4$ and $R_5$ are $C_7$ alkylenes.

15. The polymer composition according to claim 14, comprising from 10 to 80% by weight of the said aliphatic esters.

16. The polymer composition according to claim 14, in which said one or more thermoplastic polymers are selected from chlorinated vinyl polymers, thermoplastic elastomers and hydroxy acid polyesters.

17. The polymer composition according to claim 1, comprising from 10 to 80% by weight of the said aliphatic esters.

18. The polymer composition according to claim 17, in which said one or more thermoplastic polymers are selected from chlorinated vinyl polymers, thermoplastic elastomers and hydroxy acid polyesters.

19. The polymer composition according to claim 1, in which said one or more thermoplastic polymers are selected from chlorinated vinyl polymers, thermoplastic elastomers and hydroxy acid polyesters.

20. A method for plasticizing a thermoplastic polymer composition which comprises incorporating in the thermoplastic polymer composition an aliphatic ester having general formula:

$$R_1\text{—O—C(O)—}R_4\text{—C(O)—[—O—}R_2\text{—O—C(O)—}R_5\text{—C(O)—]}_m\text{—O—}R_3$$

in which:
- $R_1$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids;
- $R_2$ comprises —$CH_2$—$C(CH_3)_2$—$CH_2$— and $C_2$-$C_{24}$ alkylene groups, and comprises at least 50% by moles of the said —$CH_2$—$C(CH_3)_2$—$CH_2$—groups;
- $R_3$ is selected from one or more of the groups consisting of H, linear and branched saturated and unsaturated alkyl residues of the $C_1$-$C_{24}$ type, and polyol residues esterified with $C_1$-$C_{24}$ monocarboxylic acids;
- $R_4$ and $R_5$ comprise one or more $C_2$-$C_{22}$ alkylenes and comprise at least 50% by moles of $C_7$ alkylenes;
- m lies between 1 and 20;
- wherein $R_1$ is different from $R_3$ if $R_1$ is H;
- and wherein at least one of the $R_1$ and/or $R_3$ is present in an amount of ≥10% by moles, with respect to the total amount of $R_1$ and/or $R_3$, of polyol residues esterified with at least one $C_1$-$C_{24}$ monocarboxylic acid selected from the group of stearic acid, palmitic acid, 9-ketostearic acid, 10-ketostearic acid and mixtures thereof.

* * * * *